United States Patent [19]

Bravet et al.

[11] Patent Number: 5,554,431
[45] Date of Patent: Sep. 10, 1996

[54] SHEET OF PLASTIC MATERIAL FOR PANE AND PANE MADE USING SUCH A SHEET

[75] Inventors: Jean-Louis Bravet, Thourotte; Noel Crux, Compiegne; Anne L'Her, Paris, all of France

[73] Assignees: Saint-Gobain Vitrage, Courbevoie, France; Asahi Glass Company, Ltd., Tokyo, Japan

[21] Appl. No.: 407,949

[22] Filed: Mar. 22, 1995

[30] Foreign Application Priority Data

Mar. 22, 1994 [FR] France .................................. 94 03331

[51] Int. Cl.$^6$ .................................................. B32B 9/00
[52] U.S. Cl. ........................... 428/137; 428/34; 428/192; 428/210; 428/213; 428/212; 428/215; 428/286; 428/423.1; 428/424.6; 428/426; 428/432; 428/441; 428/911
[58] Field of Search ..................... 428/194, 210, 428/212, 426, 213, 215, 441, 137, 286, 432, 424.6, 911, 423.1, 34, 192

[56] References Cited

U.S. PATENT DOCUMENTS 4,741,961  5/1988  Frisch et al. ........................... 428/412
5,352,528  10/1994  L'Her et al. ........................... 428/426

FOREIGN PATENT DOCUMENTS

| 0054491A1 | 6/1982 | European Pat. Off. . |
| 0463747A2 | 1/1992 | European Pat. Off. . |
| 0463747A2 | 2/1992 | European Pat. Off. . |
| 1382186 | 1/1975 | United Kingdom . |
| 2041826 | 9/1980 | United Kingdom . |
| 90/13416 | 11/1990 | WIPO . |

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

A sheet of plastic material is provided adapted to be assembled with a glass substrate to form an asymmetric pane. The plastic material sheet contains at least two films, where one film is an adhesive film intended for contact with the glass substrate and a second film is adjacent to the adhesive film, at least the adjacent film containing at least one organosilane coupling agent.

15 Claims, No Drawings

SHEET OF PLASTIC MATERIAL FOR PANE AND PANE MADE USING SUCH A SHEET

BACKGROUND OF THE INVENTION

1. Field of the Invention

This invention concerns a sheet of plastic material comprising at least two films intended, in particular, for the manufacture of laminated panes known as asymmetric panes, in which the plastic sheet is associated with a monolithic or laminated substrate of glass.

2. Discussion of Background

Asymmetric panes having a sheet of plastic material and a glass substrate can be used, notably, as vehicle panes, such as windshields, lateral panes, rear window panes, roof or roof head of land transportation vehicles, as aircraft panes, and as panes for buildings and ships. Asymmetric panes of this type are described, for example, in FR-A-2 398 606 and EP-A-132 198.

The sheet of plastic material used in these asymmetric panes is generally formed of several layers or films having different properties. In effect, this sheet of plastic material must have surface properties, such as resistance to scratching, resistance to abrasion, resistance to the action and attack from external agents, such as cleaning agents and atmospheric agents. It must, in addition, have properties of adhesion to the glass substrate. It must also, if applicable, have energy-absorber, shock resistance and penetration resistance properties.

Not all of these properties can be provided satisfactorily with a single film of plastic material. This is why, as indicated above, the sheet is generally formed of at least two layers or films.

One of the problems encountered in the manufacture of asymmetric laminated panes is poor bonding of the sheet of plastic material to the glass substrate. For a laminated pane to be considered as a safety pane, it is necessary for the bonding forces between the glass substrate and the sheet of plastic material to lie between two limits. In effect, and notably when the plastic material sheet is to fulfill the function of an energy-absorber and impact resistor, the bond must not be too strong in order to prevent the sheet of plastic material, if the glass should break, from being damaged by the splinters and, on the other hand, in order that the plastic material sheet shall be able to become detached partially from the glass substrate in order to fulfill completely its energy-absorber function. Further, the bond must not be too weak in order to assure the hold between the two assembled components of the laminated pane in all conditions of use of the asymmetric pane, that is to say, in very variable conditions of temperature and humidity and of solar radiation. Moreover, the bond must be maintained over time.

On the other hand, in the case of prolonged storage of the sheet of plastic material before being assembled to the substrate, the adhesive power of the sheet must be maintained.

In order to resolve this problem of adhesion, it has already been proposed to treat the surface of the glass support intended to be in contact with the plastic material sheet with a primer composition containing a coupling agent for glass/plastic material, generally an organosilane.

The treatment of the surface of the glass may be carried out by sputtering, wiping, etc. This solution, although it is satisfactory in terms of the resultant adhesion, does have a major disadvantage; it always necessitates at least one supplementary operation for the assembling process. It, therefore, necessitates an installation that is expensive in time and labor.

To solve the problem of adhesion, it has also been proposed to incorporate a coupling agent into the composition of the film of adhesive plastic material which will contact the glass substrate. A quantity of organosilanes of between 0.05% and 0.2% by weight of the total weight of the adhesive plastic material film generally produces a sufficient adhesion during the period which follows assembly. A higher quantity of organosilanes can lead to adhesion values that are too strong and which may be prejudicial to the energy-absorber properties and resistance to penetration, as indicated above. But, although the appropriate quantities listed above result in a satisfactory adhesion after assembly, these properties do not last with time, notably when the pane is placed in conditions of high temperatures and high humidity, and when the adhesive film has a thickness less than approximately 50 µm.

A need continues to exist for plastic film materials which provide optimum adhesion properties to glass panes.

SUMMARY OF THE INVENTION

The present invention is a sheet of plastic material for use in the manufacture of a laminated pane having a substrate of glass and the plastic sheet, this sheet comprising at least two mutually adjacent films of plastic material, that is, an adhesive film which will come into contact with the glass substrate and a second adjacent film containing at least one organosilane coupling agent.

DETAILED DESCRIPTION OF THE PREFERRED EMBODIMENTS

When the adhesive film intended for contacting the glass substrate has a thickness of between about 15 µm and 50 µm, it is possible, according to one embodiment of this invention, to limit the incorporation of the organosilane to the adjacent film only. In fact, the adhesion due to the adhesive film directly after assembly, may prove to be sufficient without an organosilane. It is the organosilane initially contained in the adjacent film which, by migration towards the adhesive film and the glass/adhesive film interface, produces a satisfactory adhesion after aging of the pane.

In a second embodiment of the invention, the adhesive film is thin, preferably having a thickness less than about 15 µm, and at least one organosilane is incorporated into the compositions of both films, the adhesive film and the adjacent film.

By incorporating an organosilane into the compositions of both films, that is, both into the composition of the adhesive film which will come into contact with the glass substrate and into the composition of the film of plastic material adjacent to the adhesive film, there are obtained, on the one hand, the desired adhesion after assembly whatever may be the thickness of the adhesive film and, on the other hand, the conservation of this adhesion with time and in very variable conditions of temperature and humidity.

While not being bound by any particular theory, it appears that the good durability of the adhesion with time is due, as mentioned above, to a migration of the organosilane from the adjacent film to the adhesive film in contact with the glass substrate, and finally to the glass/plastic material interface. The adjacent film constitutes a kind of reservoir for the organosilane, which assures maintenance of the bond between glass and plastic material even when the adhesive film has a small thickness of less than about 50 μm.

The invention is applicable, therefore, with advantage to a sheet of plastic material in which the adhesive film has a thickness of less than 50 μm and, preferably, of between 2 and 20 μm, which is frequently the case when this adhesive film needs to assure only the adhesive function.

As suitable organosilanes, there may be used known alkoxysilanes and mixtures thereof chosen from among the vinylsilanes, the methacrylsilanes, the epoxysilanes and, in particular, for the latter gamma-glycidoxypropyltrimethoxysilane, beta-(3,4-epoxycyclohexyl) ethyltrimethoxysilane, gamma-glycidoxypropyltriethoxysilane and beta(3,4-epoxycyclohexyl) ethyltriethoxysilane.

These organosilanes must be sparingly reactive or substantially non-reactive with respect to the functional groups present in the reaction mixtures or the compositions adapted for forming the films of plastic material, especially the adjacent film, so as to be able to migrate to the glass/plastic material interface. Thus, in the case of polyurethane films, the organosilanes used must not react with the isocyanate groups intended for forming urethane groups. The organosilanes are used in a proportion of 0.01 to 0.5% by weight and, preferably, from 0.05 to 0.2% by weight of the weight of the film that contains them.

Generally, the same organosilane is incorporated into both the films of plastic material, although the incorporation of different organosilanes into the two films may also be carried out according to this invention.

The adhesive film is preferably chosen from the thermoplastic polyurethanes. It may also be a film based upon copolymers of ethylene and vinyl acetate (EVA). As indicated above, its thickness is small, less than 50 μm and often from 2 to 20 μm.

Appropriate thermoplastic polyurethanes are described, for example, in FR-A-2 398 606. They may be prepared from difunctional long chain polyols with molecular weights generally greater than 400 g/mole, such as polyether diols, polyester diols, polycaprolactone diols, polycarbonate diols, from short diols such as 1,2-propanediol, 1,3-propanediol, 1,2-butanediol, 1,3-butanediol, 1,4-butanediol, dimethyl-2,2-propane-1,3-diol (neopentyl glycol), 1,5-pentanediol, 1,6-hexanediol, and from difunctional diisocyanates such as 1,6-hexane diisocyanate, 2,2,4-trimethyl-1,6-hexane diisocyanate, 2,4,4-trimethyl-1,6hexane diisocyanate, bis(4-isocyanatocyclohexyl)methane, bis(3-methyl-4-isocyanatocyclohexyl)methane, 2,2-bis(4-isocyanatocyclohexyl)propane and 3-isocyanatomethyl-3,5,5-trimethylcyclohexyl isocyanate.

The film of plastic material adjacent to the adhesive film is chosen from among the thermoplastic polyurethanes, the thermosetting polyurethanes and polyvinyl butyral. The term thermoplastic polyurethanes is to be understood here as meaning layers or films based upon polyurethane having a thermoplastic character, that is to say both the purely thermoplastic polyurethanes produced from bifunctional components and also the polyurethanes that may have some crosslinking bonds by reason of the fact that they are obtained from components comprising a small proportion of compounds having a functionality greater than 2, for example triols, and/or also by reason of the fact that they are obtained from a reaction mixture and conditions capable of leading to the formation of crosslinking bonds.

This adjacent film, in order that it may be able to fulfill its function as a reservoir of organosilane, that is to say of coupling agent for glass and plastic material, generally has a thickness greater than that of the adhesive film. It preferably has a thickness greater than 100 μm, generally from 200–2,000 μm.

In addition to the adhesive film and the adjacent film of plastic material fulfilling the function of a reservoir for glass/plastic material coupling agent, the sheet of plastic material may comprise other layers or films. Thus, it may comprise, in a preferred form, a film of thermosetting polyurethane (crosslinked structure) as a surface film, generally having a thickness of from 50–1,000 μm. A suitable film of thermosetting polyurethane is, for example, one described in FR-A-2 398 606 noted above, EP-A-190 517, JP-A-86-177 241 or JP-A-86-281 118. These thermosetting polyurethane films may be produced by casting onto a plane support, a reaction mixture of an isocyanate component containing at least one isocyanate having a functionality equal to or, preferably, greater than 2, for example a biuret or an isocyanurate of hexamethylene diisocyanate and of a polyol component containing at least one polyol having a functionality greater than 2, for example a polyether polyol having a functionality of 3 or a polycaprolactone triol.

The plastic material sheet may also comprise a film of polyethylene terephthalate (PET) generally having a thickness of from 10–500 μm.

The invention also includes a pane having at least one glass substrate (laminate panes having 2,3,4 or even 5 glass panes may be used) and the sheet of plastic material described above. The glass may be non-annealed glass, annealed or thermally toughened or chemically toughened glass.

Other characteristics and advantages of the invention will be apparent from the following description of non-limiting exemplary embodiments thereof.

EXAMPLES

Example 1

A sheet of plastic material containing three polyurethane films to be assembled with a monolithic glass substrate was produced. The three polyurethane films were, respectively, a surface film based upon a thermosetting polyurethane, a film having energy-absorber properties based upon a polyurethane having a thermoplastic character and adjacent to the third film, which was an adhesive film based upon a thermoplastic polyurethane.

Onto a continuous support of glass or of a tensioned, flexible plastic material such as a film of polyethylene terephthalate, there was poured a reaction mixture of an isocyanate component containing a hexamethylene diisocyanate trimer and of a polyol component containing a trifunctional poly(ε-caprolactone) polyol. The thickness of the film was about 100 μm.

On this first film, there was formed a second film having energy-absorber properties by casting of a reaction mixture of a polyol component containing at least one polyol of molecular weight from 400 to 4,000 g/mole, at least one short diol of molecular weight less than 300 g/mole, for example 1,4-butanediol, and in a proportion of about 10 parts by weight of the polyol component, a polycaprolactone triol, and of an isocyanate component containing his(4-isocyanatocyclohexyl)methane. Into the polyol component, there had been incorporated gamma-glycidoxypropyltrimethoxysilane in a proportion of 0.10% by weight of the total weight of the polyurethane film. The thickness of the film was about 900 μm.

Onto this film having energy-absorber properties, there was applied a film of thermoplastic polyurethane having a 5 μm thickness obtained from a solution of a polyurethane resin itself obtained from a polyol component containing poly-(ε-caprolactone) polyol of molecular weight from 1,000 to 2,000 g/mole, and having a functionality of 2, and of 1,4-butanediol; and from an isocyanate component containing a mixture of bis(4-isocyanatocyclohexyl)methane and 3-isocyanatomethyl-3,5,5-trimethylcyclohexyl isocyanate. Into the solution, there had been incorporated gamma-glycidoxypropyltrimethoxysilane in a proportion of 0.10% by weight of the weight of the resin.

The thus produced sheet of plastic material was assembled onto a glass sheet of 3.5 mm thickness to form an asymmetric laminated pane useful as safety windshield for an automobile vehicle. The assembling may be carried out in two steps, a first step consisting of a preliminary assembling obtained by passage of the constituent parts of the pane through a calenderer or, in a variant, through a vacuum assembling device, and a second step consisting of an autoclave cycle, during the course of which the pane is subjected for 30 minutes to a pressure of about 6–10, preferably about 8 bars, and to a temperature of about 120°–160° C., preferably about 140° C.

For measuring the adhesion of the plastic material sheet to the glass substrate, a peeling test was performed on specimens.

Three peeling tests were carried out; one, 48 hours after assembly; a second after the boiling water test (boil-test), which consists of placing the specimen for 2 hours in boiling water; and a third after an aging test under a xenon lamp (according to American standard SAE J 1885; Weather-O-Meter test).

In these peeling tests, the force that must be applied perpendicularly to the surface of the substrate in order to unstick a 1 cm-wide strip cut from the plastic material sheet at a speed of 50 mm/min. was measured. The adhesion was satisfactory when the force exceeded or was equal to 15 N/cm.

The first peeling test gave an adhesion value of 20 N/cm.

The second test was performed 10 days after the boil-test. The adhesion value obtained was 20 N/cm.

The third test was carried out 48 hours after the specimen had been subjected for 2,000 hours to the aging test. The adhesion value was 20 N/cM.

These tests show good conservation of the adhesion.

Reference Example 1

The procedure of Example 1 was followed, except that no organosilane was incorporated into the film having energy-absorber properties, adjacent to the adhesive film.

The respective adhesion values were, respectively, 20 N/cm, 19 N/cm, and 10 N/cm. It can be noted that the adhesion after the aging test was no longer satisfactory.

Reference Example 2

The procedure of Example 1 was followed, except that no organosilane was incorporated into the adhesive film.

The adhesion values were, respectively, 14 N/cm, 25 N/cm, and 18 N/cm. The initial adhesion was no longer satisfactory.

Reference Example 3

The procedure of Example 1 was followed, except that no organosilane was incorporated either into the adhesive film or into the adjacent film.

The adhesion values were, respectively, 5 N/cm, 0 N/cm, and 5 N/cm. None of the adhesion values were satisfactory.

Example 2

The procedure was as in Example 1, except that 0.2% by weight of organosilane was incorporated into each of the two films, the adhesive film and the adjacent film.

The adhesion values were, respectively, 21 N/cm, 30 N/cm, and 24 N/cm.

Reference Example 4

The procedure was as in Example 2, except that no organosilane was incorporated into the adjacent film.

The adhesion values were 23 N/cm, 20 N/cm, and 10 N/cm. The adhesion after aging was not satisfactory.

Reference Example 5

The procedure was as in Example 2, except that no organosilane was incorporated into the adhesive film.

The adhesion values were 14 N/cm, 25 N/cm, and 20 N/cm.

The initial adhesion was not satisfactory. In contrast, after the boil-test and the aging test, the adhesion becomes satisfactory. The organosilane has apparently been able to migrate into the adhesive film.

Example 3

The procedure was as in Example 2, except that an adhesive film of 10 μm thickness was used.

The adhesion values were 30 N/cm, 30 N/cm, and 20 N/cm.

Example 4

The procedure was as in Example 2, except that an adhesive film of 15 μm thickness was used.

The adhesion values were 30 N/cm, 33 N/cm, and 21 N/cm.

Reference Example 6

The procedure was as in Example 4, except that no organosilane was incorporated into the adjacent film.

The adhesion values were 28 N/cm, 23 N/cm, and 14 N/cm. The adhesion after aging was not satisfactory.

Example 5

The procedure was as in Example 4, except that no organosilane was incorporated into the adhesive film.

The adhesion values were 20 N/cm, 37 N/cm, and 22 N/cm. The initial adhesion is satisfactory although at the start, the adhesive film does not contain any organosilane.

These tests show the influence of the incorporation of an organosilane, acting as glass/plastic sheet coupling agent, into the adhesive film and into the adjacent film, upon the adhesion forces between the glass and the plastic sheet.

The adhesion directly after assembly depends exclusively upon the thickness of the adhesive film and upon the concentration of organosilane in this film. The presence or absence of organosilane in the adjacent film has little influence upon the initial adhesion.

In contrast, after the boiling water test and the aging test, the factor that appears the most important is the concentration of organosilane in the adjacent film. This result is due, it would appear, to a considerable migration of the organosilane contained in this adjacent film to the adhesive film and the glass/plastic sheet interface. This result is all the more marked when the adhesive film has a small thickness.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A sheet of plastic material, comprising two films, a polyurethane adhesive film for contacting a glass substrate, and a reservoir film in contact with and adjacent to said adhesive film, said reservoir film or both said adhesive film and said reservoir film contain an organosilane coupling agent, wherein said organosilane coupling agent can migrate from said reservoir film to said adhesive film.

2. The sheet of claim 1, wherein both said reservoir film and said adhesive film contain said organosilane.

3. The sheet of claim 1, wherein said reservoir film has a greater thickness than the thickness of said adhesive film.

4. The sheet of claim 1, wherein said adhesive film has a thickness less than 50 μm.

5. The sheet of claim 4, wherein said adhesive film has a thickness of from 2 to 20 μm.

6. The sheet of claim 1, wherein said organosilane is contained in said reservoir film and is substantially non-reactive with said reservoir film.

7. A sheet of plastic material, comprising two films, an adhesive film for contacting a glass substrate, and a reservoir film in contact with and adjacent to said adhesive film, said reservoir film or both said adhesive film and said reservoir film containing an organosilane coupling agent, wherein said organosilane coupling agent is selected from the group consisting of epoxysilanes, methacrylsilanes and vinylsilanes.

8. The sheet of claim 6, wherein said organosilane is selected from the group consisting of epoxysilanes, methacrylsilanes and vinylsilanes.

9. The sheet of claim 8, wherein said organosilane is gamma-glycidoxypropyltrimethoxysilane.

10. The sheet of claim 1, wherein said organosilane is present in an amount of 0.01 to 0.5 parts by weight, relative to the weight of said adhesive film or said reservoir film.

11. The sheet of claim 10, wherein said organosilane is present in an amount of 0.05 to 0.2% by weight.

12. The sheet of claim 1, wherein said adjacent film has energy-absorber properties.

13. The sheet of claim 1, wherein said adjacent film is a polyurethane film.

14. The sheet of claim 1, further comprising a thermosetting polyurethane film in contact with said reservoir film.

15. A laminated pane, comprising a one glass substrate and the sheet of plastic material of claim 1.

* * * * *